May 16, 1939.     C. E. GRAHAM     2,158,116
RETAINING DEVICE
Filed Dec. 27, 1937
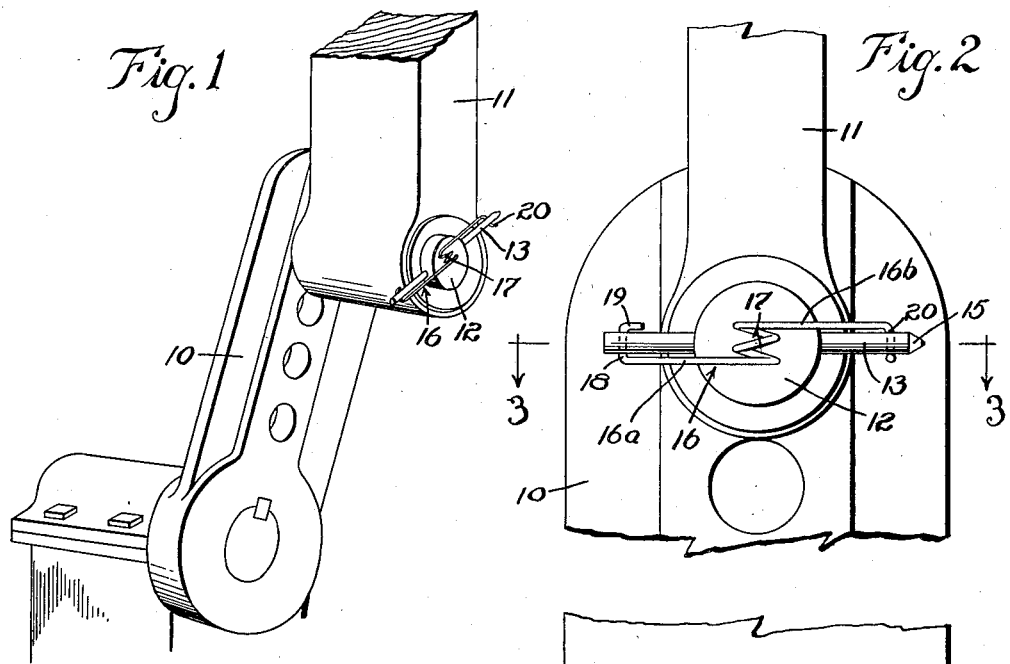
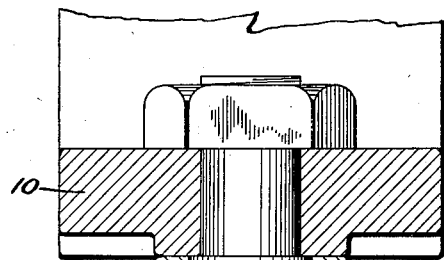
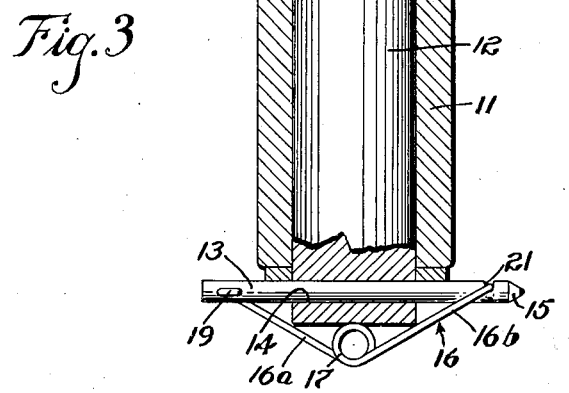
INVENTOR.
Charles E. Graham
BY
ATTORNEY.

Patented May 16, 1939

2,158,116

UNITED STATES PATENT OFFICE 2,158,116

RETAINING DEVICE

Charles E. Graham, Maricopa, Calif.

Application December 27, 1937, Serial No. 181,805

7 Claims. (Cl. 85—8.5)

This invention relates generally to retaining devices and particularly to retaining devices in which a cotter pin is employed for preventing the removal of an element from another member to which it is pivotally or otherwise movably connected.

The most commonly used cotter pins require their ends to be spread apart to retain them in position, it being necessary to bend their ends back to normal position in order to remove the same. The life of such cotter pins is short due to the necessity of bending the ends thereof and it is not uncommon to render a cotter useless by a single removal thereof. Where large cotter pins are employed, a tool is required to spread the cotter ends apart and bend them together again, and the use of such tools soon deforms the cotter ends to such an extent as to render the cotter useless. Furthermore, considerable time is often required in applying and removing cotter pins of the character referred to.

It is an object of the present invention to provide an improved retaining device; to provide an improved retaining device embodying a cotter pin which may be readily removed without the use of tools and which does not require a deforming or bending thereof in order to maintain it in position within the hole or bore in which it may be contained.

It is another object of the invention to provide an improved retaining device embodying a cotter pin which can be held in operative position upon its supporting member by frictional engagement between the support and a latching device connected with the cotter pin.

A further object of the invention resides in preventing displacement of a cotter pin in a bore by exerting a substantially uniform pressure between the cotter pin and the walls of the bore engaged thereby throughout the entire length of that portion of the pin lying within the bore.

A further object of the invention resides in maintaining a cotter pin in position within a bore by developing a frictional restraining force between the pin and walls of the bore by means connected with the cotter pin, and supplementing this frictional force by engagement of said means with a part intermediate said pin and means.

This invention possesses many other advantages and has other objects which will be made more easily apparent from a consideration of one embodiment thereof shown in the accompanying drawing and forming a part of the present specification. This form, which illustrates the general principles of the invention, is hereinafter described in detail; but it is to be understood that this description is not to be taken in a limiting sense, since the scope of the invention is best defined in the appended claims.

In the drawing:

Figure 1 is a perspective view of an oil well crank and pitman arrangement embodying my improved retaining device for preventing the removal of the pitman from the crank pin.

Figure 2 is an enlarged front elevational view of the connected ends of the crank and pitman arrangement shown in Figure 1 and also embodying the invention, and Figure 3 is a horizontal sectional view taken as indicated by line 3—3 of Figure 2.

For illustrative purposes I have adapted my improved retaining device to the crank pin of an oil well crank for the purpose of retaining the pitman and crank in connected relationship. Referring more particularly to the drawing, the crank is designated 10, and is pivotally connected with the lower end of a pitman 11 through a crank pin 12 carried on said crank.

The retaining device provided by the present invention includes a cotter pin 13 passing through a transverse opening 14 in the outer end of the crank pin 12, the lower end of the pitman being disposed between said cotter pin and the outer face of the crank 10. In the drawing the cotter pin 13 and opening 14 are shown as being cylindrical in cross section and said cotter is preferably provided with a tapered end 15 for facilitating its entrance into the opening 14. Although the cotter pin 13 and opening 14 are shown as being cylindrical they might be formed of any suitable cross sectional configuration.

The cotter pin 13 is held in place within the opening 14 by locking means such as the spring latch 16, which is secured to said cotter and is arranged to extend over the end of the crank pin 12. Said latch is preferably made from spring wire and is formed with a central coiled portion 17 which engages the end face of the crank pin as shown clearest in Figure 3. One end of the latch is pivotally connected to one end of the cotter pin 13 and the opposite end of said latch is releasably held by the opposite end of the cotter pin. The pivotal connection between the cotter pin and latch is effected by forming one end of the latch with a turned in portion 18 which passes through an opening in the cotter pin. The terminal end of said latch is bent as at 19 to restrain the pivoted end of the latch against removal from the cotter pin. The releasable end of the latch is provided with a turned in portion 20 which is held in a slot 21 formed in the opposite end of the cotter pin 13.

When the locking means 16 is in its latched position, sufficient pressure is applied between its coiled portion 17 and the end of the crank pin, to maintain the cotter pin 13 in tight engagement with that surface of the cotter pin bore nearest said coiled portion. The cotter pin is thus restrained against any appreciable longitudinal movement within the bore 14. However, the cotter pin is further ensured against removal from the bore by the latch portions 16a and 16b extending between the opposite ends of the coiled portion 17 and the cotter pin ends. As shown clearest in Figure 3, these portions are angularly disposed when the latch is in operative position, and any appreciable longitudinal movement of the cotter pin is prevented by their abutment with the outermost edge of the crank pin 12. Furthermore, the cotter pin is restrained against rotative movement within the bore 14 by the engagement of the latch 16 with the end of the crank pin 12.

The locking device may be readily unlatched and the cotter pin removed, by forcing the free end of the latch out of the pin slot 21 with the fingers and moving it slightly to one side so as to permit its movement past the end of the cotter pin.

By disposing the locking device over the end of the crank pin and away from all moving parts, it will be obvious how any danger of damaging said device is reduced to a minimum.

I claim:

1. A retaining device comprising a cotter pin, locking means connected to said cotter pin, said locking means having an intermediate portion spaced from said pin and adapted to be placed under tension by engagement with means interposed between it and said pin, whereby said locking means tends to move the cotter pin toward said intermediate portion.

2. A retaining device including a cotter pin, a latch pivotally connected at one end with said pin, the opposite end of said latch being adapted to be releasably connected with said pin, said latch having spring means intermediate its ends adapted to be placed under tension by engagement with means interposed between said spring means and said cotter pin.

3. A retaining device including a cotter pin, adapted for entrance into an opening near the end of a member, and locking means connected with the cotter pin and having a portion adapted to be placed under tension by engagement with the end of said member for maintaining the cotter pin in said opening.

4. In a mechanism wherein a member is retained upon a shaft for relative movement with respect thereto, said shaft having a hole therethrough; the combination of a cotter pin adapted to pass through said hole, and locking means connected with the cotter pin near the ends thereof and having an intermediate portion adapted to be placed under tension by engagement with said shaft for maintaining said pin in said hole.

5. In a mechanism wherein a member is retained upon a shaft for relative movement with respect thereto, said shaft having a hole therethrough near its end; the combination of a cotter pin adapted to pass through said hole, and locking means connected with the cotter pin near the ends thereof and having an intermediate portion adapted to be placed under tension by engagement with the end of said shaft for maintaining said pin in said hole.

6. A retaining device including a cotter pin adapted for entrance into an opening near the end of a member, a latch pivotally connected at one end with said pin, the opposite end of said latch being adapted to be releasably connected with said pin, said latch having spring means intermediate its ends adapted to be placed under tension by engagement with the end of said member for maintaining the cotter pin in said opening.

7. A retaining device including a cotter pin adapted for entrance into an opening near the end of a member, a latch connected to said cotter pin, said latch including oppositely extending portions engageable with the ends of said pin and an intermediate spring coil adapted to engage the end of said member for producing tension in said oppositely extending portions, whereby to hold the pin in tight engagement against the wall of its confining opening.

CHARLES E. GRAHAM.